United States Patent Office 3,100,225
Patented Aug. 6, 1963

3,100,225
PROCESS FOR THE PRODUCTION OF FLUORINE-CONTAINING ORGANIC COMPOUNDS
Albrecht Zappel, Cologne-Stammheim, and Heinz Jonas, Leverkusen, Germany, assignors to Farbenfabriken Bayer Aktiengesellschaft, Leverkusen, Germany, a corporation of Germany
No Drawing. Filed Dec. 19, 1960, Ser. No. 76,493
Claims priority, application Germany Dec. 24, 1959
9 Claims. (Cl. 260—487)

The invention is concerned with a process for the production of fluorine-containing organic compounds by thermal decomposition of fluorosulphinic acid esters. A particular advantage of the process is its versatility. Not only can simple alkyl fluorides be prepared in accordance with the process, but complicated compounds with functional groups, for example ethers or carboxylic acid esters can also be prepared.

The decomposition proceeds in accordance with the following reaction scheme

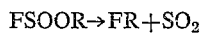

R standing for an organic radical.

Concurrently with this reaction, there is a disproportionation reaction which is strongly pronounced with fluorosulphinic acid esters:

Whereas the disproportionation predominates at relatively low temperatures of up to approximately 150° C., the desired decomposition reaction proceeds substantially more rapidly at higher temperatures. The most favourable temperature for the decomposition into $SO_2$ and RF differs from compound to compound and must be established for each specific case. The temperature range within which the decomposition may be carried out is between about 100° to about 300° C. preferably 150° and 220° C. In order to avoid losses in the yield by disproportionation of the fluorosulphinic acid ester, it is accordingly necessary to heat rapidly up to the decomposition temperature. Generally speaking, this condition is particularly well fulfilled in pressure vessels, as by using pressure vessels the entire reaction zone can quickly be brought to the required temperature. The product to be decomposed is thereby not prevented from rapidly being brought to a high temperature, as occurs when boiling under reflux is used as a method of heating. A particularly suitable material for the decomposition apparatus is silver. Glass vessels are unsuitable, since fluorosulphinic acid esters attack glass to a certain extent and in addition glass greatly accelerates the disproportionation reaction. Steel vessels are harmful, since heavy metal halides can form on the surface, and as acceptor compounds, these unfavourably influence the decomposition due to their catalytic action on the olefinic splitting of the organic fluoride.

As starting materials, fluorosulphinic acid methyl ester comes into consideration and also the corresponding ethyl, propyl, butyl, octyl, nonyl esters, but also fluoro sulphinic acid β-methoxyethyl ester and fluorosulphinic acid α-carboxyethyl ester may be used.

Donor compounds, such as tertiary amines which are aliphatically and/or aromatically substituted are suitable as catalytic additives. Such donor compounds are e.g. tributylamine, dimethyl aniline, pyridine.

Without the addition of donor compounds, and particularly when acceptor compounds, such as $BF_3$, $AlCl_3$, $ZnCl_2$, $SnCl_2$ and others are added, the decomposition of the organic fluorine compounds into olefines and HF is very marked. In addition, the organic decomposition product may undergo transformation to a considerable degree, for example by isomerisation. Thus, for example with the decomposition of fluorosulphinic acid-n-butyl ester, relatively small quantities of 2-butyl and 1-butyl fluorides are formed as well as a large quantity of butene-1 and butene-2.

The fluorosulphinic acid esters can be prepared by fluorination of the corresponding chlorosulphinic acid esters with $KSO_2F$.

The preparation of chlorosulfinic acid esters is described in the following specifications: Stähler and Schirm, Berichte 44, page 321, or A. Streitwieser et al., Journ. Am. Chem. Soc. 79 (1957), pages 379–381. The production of potassium fluorosulfinate ($KSO_2F$) is described by F. Seel et al., Angew. Chemie 67 (1955), page 32 et seq.

The invention is further illustrated by the following examples.

Example 1

(a) 0.1 mol of fluorosulphinic acid-n-butyl ester is heated in a silver apparatus with a reflux condenser. The substance boils under reflux at a sump temperature of about 120° C. 90% of the substance introduced is undecomposed after heating for 5 hours. Small quantities of 1-butyl and 2-butyl fluorides as well as $SO_2$ can be detected.

(b) 0.1 mol of fluorosulphinic acid-n-butyl ester are quickly heated to 180° C. in a silver autoclave with a capacity of 250 ml. and kept at this temperature for 1 hour. The volume of the gases which are formed is measured and the mixture is analysed by mass spectroscopy. The following gases were formed:

| | Percent yield |
|---|---|
| $SO_2$ | 89 |
| Butene | 56 |
| 1-$C_4H_9F$ | 23 |
| 2-$C_4H_9F$ | 6 |

(c) 0.1 mol of fluorosulphinic acid-n-butyl ester is heated in the presence of 1% by weight of $BF_3$-etherate in a silver apparatus as in Example 1. The sump temperature is raised in 25 minutes to 190° C. The gases formed are collected and analysed and the following are found:

| | Percent yield |
|---|---|
| $SO_2$ | 90 |
| Butene | 43 |
| 1-$C_4H_9F$ | 10 |
| 2-$C_4H_9F$ | 26 |

Similar experiments in the presence of other acceptor molecules such as $AlF_3$, $AlCl_3$, $SnCl_2$, $SnF_2$ and $ZnCl_2$ show in principle the same result.

(d) 0.1 mol of fluorosulphinic acid-n-butyl ester is heated in the presence of 1% by weight of tributylamine in the silver apparatus described in Example 1. This reaction mixture boils for about 1 hour under reflux at a sump temperature of 120° C.; with increasing decomposition, the temperature rises in 1 hour to 200° C. The gases which form are collected and analysed as is the residue remaining in the reaction vessel. The result of the experiment shows:

57.6% yield of $SO_2$
3% yield of $C_4H_8$
34% yield of 1-$C_4H_9F$
3% yield of 2-$C_4H_9F$
46% disproportionation to $S(OC_4H_9)_2$ and $SOF_2$ (e) 0.1 mol of fluorosulphinic acid n-butyl ester is heated in a silver autoclave in the presence of 1% by weight of dimethyl aniline in 1 hour to 200° C. and kept for a further hour at this temperature. On working up the reaction products the following products are obtained:

89% yield of $SO_2$
5% yield of $C_4H_8$
89% yield of 1-$C_4H_9F$

2-$C_4H_9F$ cannot be detected.

Similar experiments with other donor compounds in the form of tertiary amines such as tributylamine and pyridine give similar results.

*Example 2*

(a) Fluorosulphinic acid-β-methoxyethyl ester ($FSOOCH_2CH_2OCH_3$)

is boiled under reflux for 3 hours in a silver apparatus, the sump temperature being 138° C. With the subsequent fractional distillation, the major part, about 90% is recover without decomposition.

(b) 0.1 mol of $FSOOCH_2CH_2OCH_3$ is quickly heated to 200° C. in an autoclave lined with silver and kept for 1 hour at this temperature. On working up, β-fluoroethyl methyl ether is obtained in a yield of approximately 20% and methyl fluoride in a yield of about 7%. The product introduced has certainly been quantitatively decomposed, but substance of higher boiling point which cannot be identified have in the main been formed.

(c) On heating $FSOOCH_2CH_2OCH_3$ without pressure in the presence of acceptor molecules (1%) such as $BF_3$ in the form of its etherate, $AlCl_3$, $SnCl_2$, $ZnCl_2$ etc., complete decomposition occurs. It is mainly $CH_3F$ which is formed, and β-fluoroethyl methyl ether cannot be detected. The decomposition does not proceed in the desired manner.

(d) 0.1 mol of $FSOOCH_2CH_2OCH_3$ is heated with 1% by weight of a donor compound, such as pyridine, dimethylaniline, tributylamine or the like in a silver apparatus. The substance boils initially under reflux at a sump temperature of about 130° C. During the experiment, which last 8 hours, the sump temperature rises to about 200° C. On working up, a yield of 93% of bis-β-methoxyethyl sulphite $OS(OCH_2CH_2OCH_3)_2$ is found, that is to say, the fluorosulphinic acid ester is almost quantitively disproportionated.

(e) 0.1 mol of $FSOOCH_2CH_2OCH_3$ is quickly heated together with 1% by weight of tributylamine in a silver autoclave to 180° C. and kept at this temperature for 1 hour. A pressure of 15 atm. results.

Working up gives a yield of 76% of $FCH_2CH_2OCH_3$. About 2% of methyl fluoride is formed.

(f) 0.5 mol of $FSOOCH_2CH_2OCH_3$ is heated for 2 hours to 200° C. as in Example 2e, the maximum pressure being 48 atm. β-fluoroethyl methyl ether is isolated in a yield of 65% and a yield of about 7% of $CH_3F$ is obtained. $FCH_2CH_2OCH_3$ boils at 57° C. under normal pressure ($n_D^{20}$ 1.3487, $D_4^{20}$ 0.94).

*Example 3*

Fluorosulphinic acid-α-carboethoxyethyl ester $FSOOCH(CH_3)COOC_2H_5$ which is obtained for example by fluorination of the corresponding chlorosulphinic acid ester with $KSO_2F$, has a behaviour on decomposition which is quite similar to that of the fluorosulphinic acid-β-methoxyethyl ester described above Without decomposition catalysts and in the presence of acceptor molecules, the decomposition proceeds in an uncontrollable manner and with only small yields of the required α-fluoropropionic acid ethyl ester. In the presence of donors and when heating without pressure, it is mainly the disproportionation reaction to $SOF_2$ and $OS(OCH(CH_3)COOC_2H_5)_2$ which takes place. Good yields are on the other hand obtained in the presence of donor molecules such as tertiary amines and rapid heating in a pressure vessel to the decomposition temperature.

Using a 250 ml. silver autoclave, 0.3 mol=55.2 g. of $FSOOCH(CH_3)COOC_2H_5$ and 0.5 g. of dimethyl aniline are quickly heated in a few minutes to 200° C. and kept at this temperature for 2 hours, a pressure of 27 atm. resulting.

There are formed:

92% of theory of $SO_2$
63% of theory of $CH_3CHFCOOC_2H_5$ as well as 6% of $C_2H_5F$, 1.1% of $C_2H_4$ and products of higher boiling point which cannot be identified. α-Fluoro-propionic acid ethyl ester is fractionally distilled in a rotary band column. The boiling point at normal pressure is 121° C.

We claim:

1. A process of preparing an organic fluorine-containing compound selected from the group consisting of esters, ethers, and alkyl fluorides which comprises thermally decomposing a fluoro-sulfinic acid ester by heating said ester to a temperature of from about 100 to about 300° C. and recovering the organic fluorine-containing compound thereby formed.

2. Process according to claim 1, which comprises effecting said heating to a temperature of from about 150–220° C.

3. Process according to claim 1, which comprises effecting said heating in the presence of a tertiary amine.

4. Process according to claim 3, wherein said tertiary amine is tributylamine.

5. Process according to claim 3, wherein said tertiary amine is dimethylaniline.

6. Process according to claim 3, wherein said tertiary amine is pyridine.

7. A process of preparing 1-butylfluoride, which comprises thermally decomposing fluorosulfinic acid n-butyl ester by heating said ester at a temperature of about 200° C. in the presence of about 1% by weight of dimethylaniline and recovering the 1-butylfluoride thereby formed.

8. A process of preparing β-fluoroethyl methyl ether which comprises thermally decomposing fluorosulfinic acid-β-methoxy ethyl ester by heating said ester to a temperature of about 180° C. at a pressure of about 15 atmospheres in the presence of about 1% by weight of tributylamine and recovering the β-fluoroethyl methyl ether thereby formed.

9. A process for preparing α-fluoropropionic acid ethyl ester which comprises thermally decomposing fluorosulfinic acid α-carbo-ethoxy-ethyl ester by heating said ester to a temperature of about 200° C. at a pressure of 27 atmospheres in the presence of about 1% by weight of dimethylaniline and recovering the α-fluoro-propionic acid ethyl ester thereby formed.

No references cited.